United States Patent
Whitnah et al.

(10) Patent No.: US 9,832,150 B2
(45) Date of Patent: *Nov. 28, 2017

(54) RESOURCE MANAGEMENT OF SOCIAL NETWORK APPLICATIONS

(71) Applicant: Facebook, Inc., Menlo Park, CA (US)

(72) Inventors: Thomas Scott Whitnah, Mountain View, CA (US); Alexander Matthew Rush, Brokklyn, NY (US); Ding Zhou, San Francisco, CA (US); Ruchi Sanghvi, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 15/006,004

(22) Filed: Jan. 25, 2016

(65) Prior Publication Data

US 2016/0142354 A1    May 19, 2016

Related U.S. Application Data

(63) Continuation of application No. 14/457,483, filed on Aug. 12, 2014, now Pat. No. 9,276,894, which is a
(Continued)

(51) Int. Cl.
*G06F 15/173* (2006.01)
*H04L 12/58* (2006.01)
(Continued)

(52) U.S. Cl.
CPC .......... *H04L 51/12* (2013.01); *G06F 17/3053* (2013.01); *G06Q 10/10* (2013.01);
(Continued)

(58) Field of Classification Search
CPC ......... H04L 67/22; H04L 43/08; H04L 67/30; H04L 67/42; G06F 17/30699
See application file for complete search history.

(56) References Cited

U.S. PATENT DOCUMENTS 5,796,967 A    8/1998  Filepp et al.
6,842,901 B1   1/2005  Miller
(Continued)

OTHER PUBLICATIONS

Boslet, M., "Two different neighborhoods in cyberspace: Virtual worlds, social networks may intersect," Knight Ridder Tribune News Service, Aug. 7, 2007, three pages.
(Continued)

*Primary Examiner* — Hitesh Patel
(74) *Attorney, Agent, or Firm* — Fenwick & West LLP

(57) ABSTRACT

Applications in social networks support interaction between members through various types of channels such as notifications, newsfeed, and so forth. For each channel, applications are ranked based on their user affinity measures. User affinity is based on measuring positive and negative interactions by users as both senders and recipients of messages generated by applications. Metrics are computed for the different types of messages and interactions provided by applications. For each channel, an application receives user affinity score based on specific weighted combination of the metrics. Applications use channel resources to send messages to increase their user base. Given the large number of applications that are available, the extent to which applications are allowed to use channels is controlled, limiting their resource consumption. User affinity scores of applications calculated for a channel are used to decide the allocation of channel resources for an application.

22 Claims, 15 Drawing Sheets

Related U.S. Application Data continuation of application No. 13/617,537, filed on Sep. 14, 2012, now Pat. No. 8,868,752, which is a continuation of application No. 12/253,149, filed on Oct. 16, 2008, now Pat. No. 8,307,086, which is a continuation-in-part of application No. 12/194,511, filed on Aug. 19, 2008.

(51) Int. Cl.
  *G06Q 10/10* (2012.01)
  *H04L 29/08* (2006.01)
  *G06F 17/30* (2006.01)
  *H04L 12/911* (2013.01)

(52) U.S. Cl.
  CPC ............ *H04L 47/783* (2013.01); *H04L 67/16* (2013.01); *H04L 67/20* (2013.01); *H04L 67/34* (2013.01); *H04L 51/32* (2013.01); *H04L 67/306* (2013.01)

(56) References Cited

U.S. PATENT DOCUMENTS

| | | | | |
|---|---|---|---|---|
| 7,644,671 | B2 * | 1/2010 | Smith | B68G 7/054 112/475.08 |
| 7,844,671 | B1 | 11/2010 | Lawler et al. | |
| 2003/0135818 | A1 | 7/2003 | Goodwin et al. | |
| 2005/0171955 | A1 * | 8/2005 | Hull | G06Q 50/01 |
| 2005/0181803 | A1 | 8/2005 | Weaver et al. | |
| 2005/0198305 | A1 * | 9/2005 | Pezaris | H04L 51/12 709/227 |
| 2005/0228775 | A1 | 10/2005 | Nilsen et al. | |
| 2006/0149731 | A1 | 7/2006 | Schirmer et al. | |
| 2006/0206820 | A1 | 9/2006 | Bullard et al. | |
| 2006/0218141 | A1 | 9/2006 | Tuttle et al. | |
| 2007/0136753 | A1 | 6/2007 | Bovenschulte et al. | |
| 2007/0185776 | A1 | 8/2007 | Nguyen et al. | |
| 2008/0040475 | A1 * | 2/2008 | Bosworth | G06Q 30/08 709/224 |
| 2008/0083031 | A1 | 4/2008 | Meijer et al. | |
| 2008/0183811 | A1 | 7/2008 | Kotras et al. | |
| 2009/0193097 | A1 | 7/2009 | Gassewitz et al. | |
| 2009/0217178 | A1 * | 8/2009 | Niyogi | G06Q 10/00 715/753 |

OTHER PUBLICATIONS

Groebner, D. et al., "Business Statistics: A Decision-Making Approach," 1981, pp. 90-95, pp. 516-519, Charles E. Merrill Publishing Company, Columbus, Ohio, USA.
PCT International Search Report and Written Opinion, PCT Application No. PCT/US2009/052690, dated Sep. 15, 2009, nine pages.
PCT International Search Report and Written Opinion, PCT Application No. PCT/US2009/053222, dated Sep. 21, 2009, eleven pages.
United States Office Action, U.S. Appl. No. 12/194,511, dated Apr. 17, 2014, fifteen pages.
United States Office Action, U.S. Appl. No. 12/194,511, dated Aug. 21, 2013, fourteen pages.
United States Office Action, U.S. Appl. No. 12/194,511, dated Feb. 21, 2013, fourteen pages.
United States Office Action, U.S. Appl. No. 12/194,511, dated Jun. 21, 2011, thirteen pages.
United States Office Action, U.S. Appl. No. 12/194,511, dated Jun. 28, 2012, fourteen pages.
United States Office Action, U.S. Appl. No. 12/194,511, dated Nov. 1, 2010, twelve pages.
United States Office Action, U.S. Appl. No. 12/253,149, dated Aug. 30, 2011, thirty-seven pages.
United States Office Action, U.S. Appl. No. 12/253,149, dated Feb. 15, 2011, twenty-nine pages.
United States Patent and Trademark Office, Notice of Allowance and Fee(s) Due, U.S. Appl. No. 12/253,149, dated Jul. 11, 2012, 11 pages.
United States Office Action, U.S. Appl. No. 12/194,511, Sep. 21, 2017, seventeen pages.

\* cited by examiner

RESOURCE MANAGEMENT OF SOCIAL NETWORK APPLICATIONS

CROSS REFERENCE TO RELATED APPLICATIONS

This application is a continuation of U.S. patent application Ser. No. 14/457,483, filed on Aug. 12, 2014, which is a continuation of U.S. patent application Ser. No. 13/617,537, filed on Sep. 14, 2012, now issued as U.S. Pat. No. 8,868,752, which is a continuation of U.S. patent application Ser. No. 12/253,149, filed on Oct. 16, 2008, now issued as U.S. Pat. No. 8,307,086, which is a continuation-in-part of U.S. application Ser. No. 12/194,511, filed on Aug. 19, 2008, the contents of each of which is incorporated by reference in its entirety.

FIELD OF THE INVENTION

This invention relates to social networking websites that allow third party application developers to provide applications for users of the social networking website to install and run.

BACKGROUND

Some social network websites provide application developers with the ability to create applications that extend the functionality of the social networking website to provide new ways for users to interact with each other. For example, an application may provide an interesting way for a member (also called user of the social networking website) to communicate with his friends, or allow users to participate in multi-player games, or collect some interesting information such as news related to a specific topic and display it to the member periodically; another application may provide a "newsfeed" about the activities of the member to that member's friends.

Social networking websites typically provide mechanisms (referred to as channels) for members to communicate with each other, e.g., emails, invitations, notifications, newsfeeds etc. Social networking applications typically make use of the various channels to provide useful features to the members, such as sending out emails about the member's activities, displaying a newsfeed to the member's friends, and so forth.

The success of such an application generally depends on how many members install and run the application. Many application developers rely on an expectation of a "virtuous cycle" to build up the user base for their application: the application provides a certain functionality that becomes increasingly beneficial as more and more members adopt the application. Users of such applications thereby have an inherent incentive to install and use the application. Some application developers attempt to exploit member behavior and the availability of the various channels as resources to increase their user base. For example, when a member tries to run an application, the application may not enable full functionality until the member sends out messages to the member's friends inviting them to use this particular application. Applications also try various mechanisms to get member's attention such as sending notifications or emails or by occupying space on the webpage viewed by the member while viewing the social networking website.

A typical member of the social networking website is likely to spend only a limited amount of time on the website, and as a result, has a generally limited amount of time to review messages, invitations, notifications from application, as well a limited amount of time to search for applications the member would like to use. An excessive number of invitations and messages from applications only cause the member to ignore such messages; if messages from abusive applications become too frequent, then the member learns to distrust or ignore all such communications, thereby impeding the distribution of all applications, not merely abusive ones. Also, a typical member prefers to limit how many applications appear on the webpage when viewing the social networking website.

Since the total number of applications available on a social networking website can grow to be very large and each application is trying to get the member's attention and trying to increase its user base, the end result is that members can get inundated with information from applications that they may not be interested in. Members would like to see and focus on information that they like and be able to avoid or minimize the information that they do not like.

SUMMARY

Applications on a social networking website use channels to interact with members of the social networking website. Each channel provides specific mechanisms to interact with the member, whether through messages, notification, appearance on the user's profile page, or the like. Given the large number of applications that are available, it is beneficial to control the extent to which applications have access to the channels and thereby limit their resource consumption. A computer implemented method, computer implemented system and computer program product controls channel resource consumption of applications provided on a social networking website based on a score of each application that measures the user affinity towards the application. User affinity is measured based on user interactions that can be considered as feedback provided by the members, and such feedback can be deemed to be positive, negative, or neutral. User interactions can provide either implicit or explicit feedback. For example, an application can provide a notification to the member on the member's web page. If the member ignores the notification when viewing the web page, e.g., does not click on or otherwise interact with the application, this is an implicit feedback that can be interpreted to mean that the member is neutral towards the application. But, if the member clicks on a link in the notification that unsubscribes the member from further notifications from this application, the member has provided explicit negative feedback towards the application. On the other hand, if the member clicks on a link in the notification that provides the member with more information about the application, the member has provided an explicit positive feedback about the application.

The rates of occurrences of various types of user interaction associated with an application and a channel computed over various time intervals provide a measure of the likelihood that a member will take that specific action when presented with the given application based on that channel. This provides a measure of the user affinity towards the specific application with regards to a specific action associated with a channel. Several such metrics associated with different actions associated with each application are computed for a channel. These channel metrics are combined for each application to arrive at a single aggregate value of the user affinity metric for the application for a channel called the user affinity score. An application with a high user affinity score compared to other applications is liked more by its current users compared to applications with lower user affinity score. There is a high probability that new users are also going to like an application rated high on a user affinity ranking. The social networking website can be adapted to promote applications with high user affinity ranking, as compared to applications that are ranked lower by providing better channel resources to applications with high user affinity ranking.

An allocation of the channel resource for an application is determined based on the application's user affinity score. The use of the channel resource by the application during a time interval is measured. The application is not allowed to use more channel resources than determined by the allocation of the channel resource for the application based on its user affinity score. An example of a channel resource used by applications comprises messages sent on a channel that allows applications to communicate with users by sending messages. One embodiment disables an application from being accessible to users of the social networking website if the user affinity score of the application indicates very low user affinity of the users towards the application. Another embodiment enables an application to be accessible to users of the social networking website if the user affinity score of the application indicates at least a minimum user affinity. Another embodiment determines a per channel allocation of a channel resource for the application based on user affinity score as well as a per user per channel allocation of the channel resource based on user affinity score. If an application meets the per user per channel allocation of the channel resource for a user during a time interval, the application is disabled from using the channel for that user and if the application meets the per channel allocation in a time interval, the application is disabled from using the channel in that time interval. The process of calculating the score value, determining channel allocation for an application in a time interval and controlling the channel resource usage of the application based on the channel allocation is repeated periodically, allowing the application the ability to improve its score and increase its channel resource allocation in subsequent time intervals.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Applications on a Social Networking Website

A social networking website offers its members the ability to communicate and interact with other members of the website. In use, members join the social networking website and then add connections to a number of other members to whom they desire to be connected. As used herein, the term "friend" refers to any other member to whom a member has formed a connection, association, or relationship via the website. Connections may be added explicitly by a member, for example, the member selecting a particular other member to be a friend, or automatically created by the social networking site based on common characteristics of the members (e.g., members who are alumni of the same educational institution). Connections in social networking websites are usually in both directions, but need not be, so the terms "member" and "friend" depend on the frame of reference. For example, if Bob and Joe are both members and connected to each other in the website, Bob and Joe, both members, are also each other's friends. The connection between members may be a direct connection; however, some embodiments of a social networking website allow the connection to be indirect via one or more levels of connections. Also, the term friend need not require that members actually be friends in real life, (which would generally be the case when one of the members is a business or other entity); it simply implies a connection in the social networking website.

Figure 1:
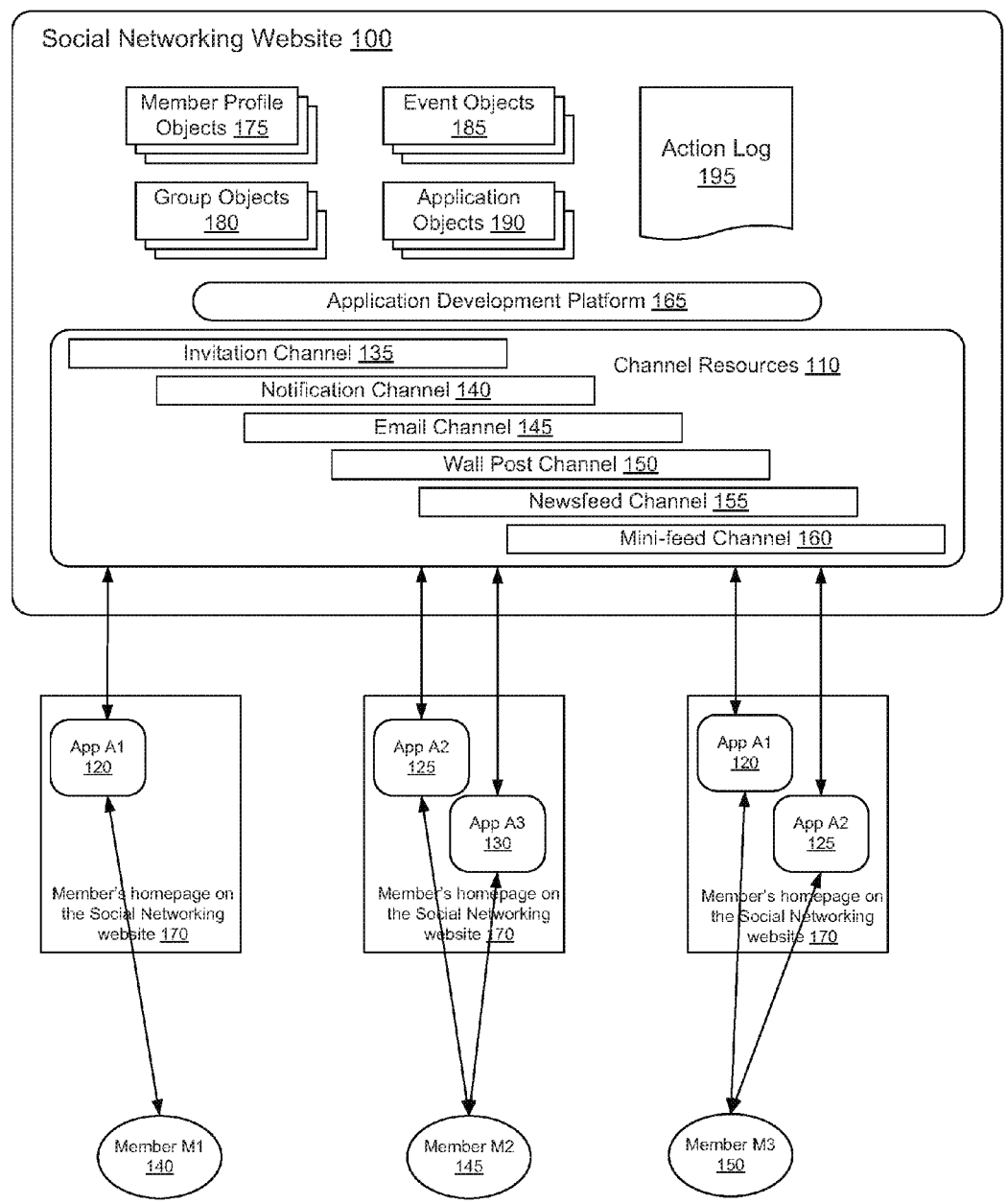
FIG. 1 is high-level diagram illustrating the interaction of users with the applications on a social networking website.
Figure 2:
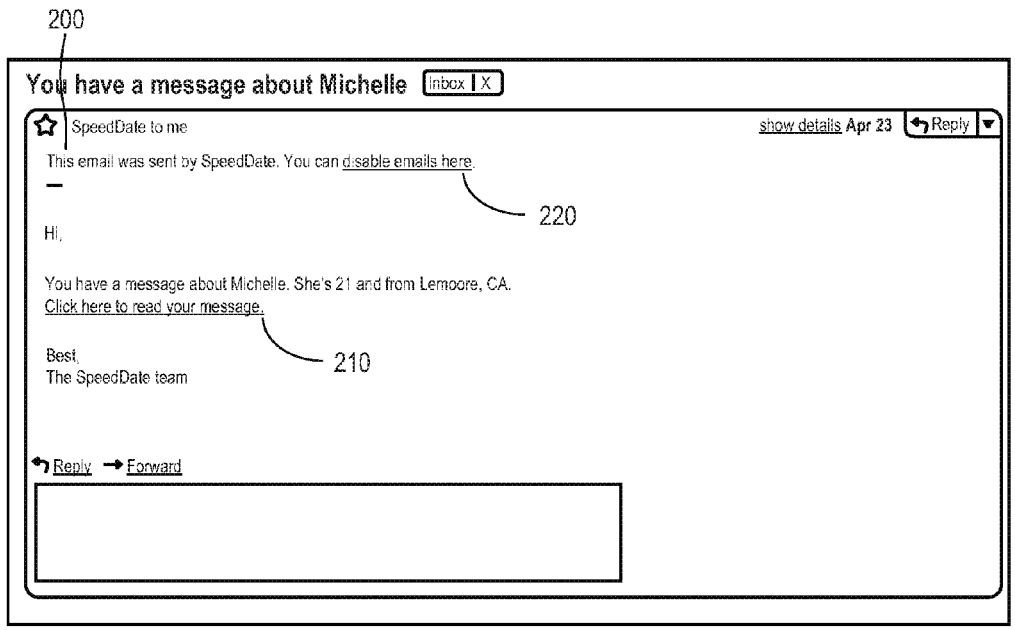
FIG. 2 shows an example of how the email channel is used by applications.

There are various mechanisms available to members to communicate with each other or to obtain information that they find interesting such as activities that their friends are involved with, applications that their friends are installing, comments made by friends on activities of other friends etc. The mechanisms of communication between members are called channels available as resources 110. A channel is a computer mediated communication mechanism for facilitating communication between users of the social network and the social network. As illustrated in FIG. 1, the following channels are available to users of a social networking website 100 in one embodiment:

Email Channel 145: Members can communicate by emails. FIG. 2 shows an example of email received by a member that was sent by an application called Speed-Date. The email 200 shown in FIG. 2 provides a link 210 to allow the member to get more details related to the email and a link 220 to disable the application from sending further emails to the member.

Figure 3:
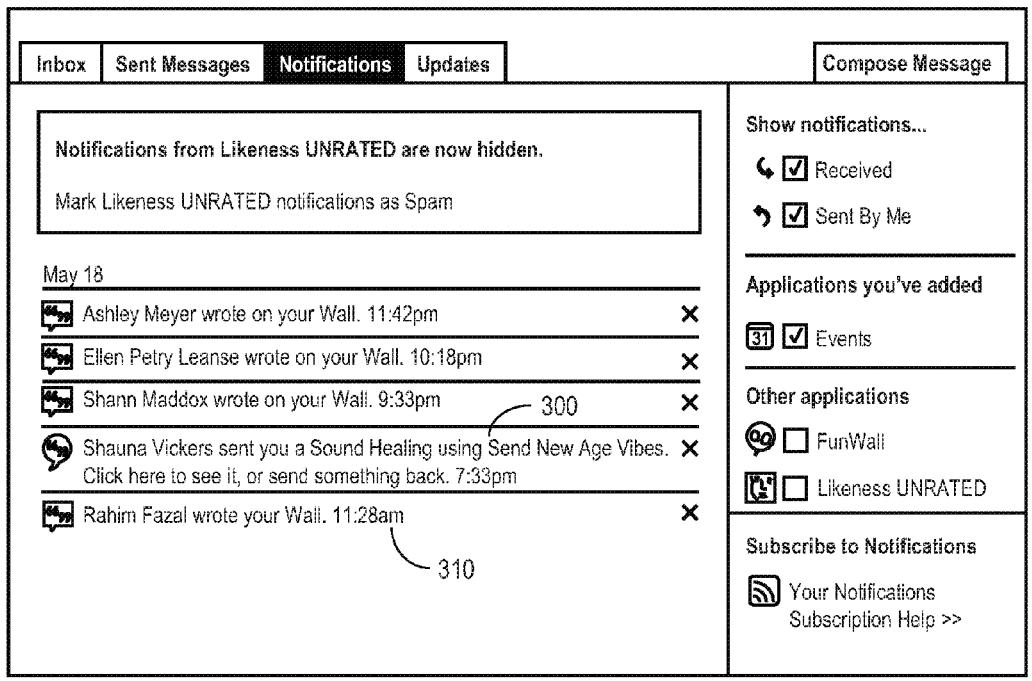
FIG. 3 shows an example of how the notification channel is used by applications.

Notification Channel 140: A notification is a message informing a member that some activity involving the member has occurred on the social network. FIG. 3 shows an example of notifications obtained by a member including a message 300 sent by another member using an application called "Send New Age Vibes". Another notification 310 in FIG. 3 shows an example of a notification sent by the wall post application to the member.

Figure 4:
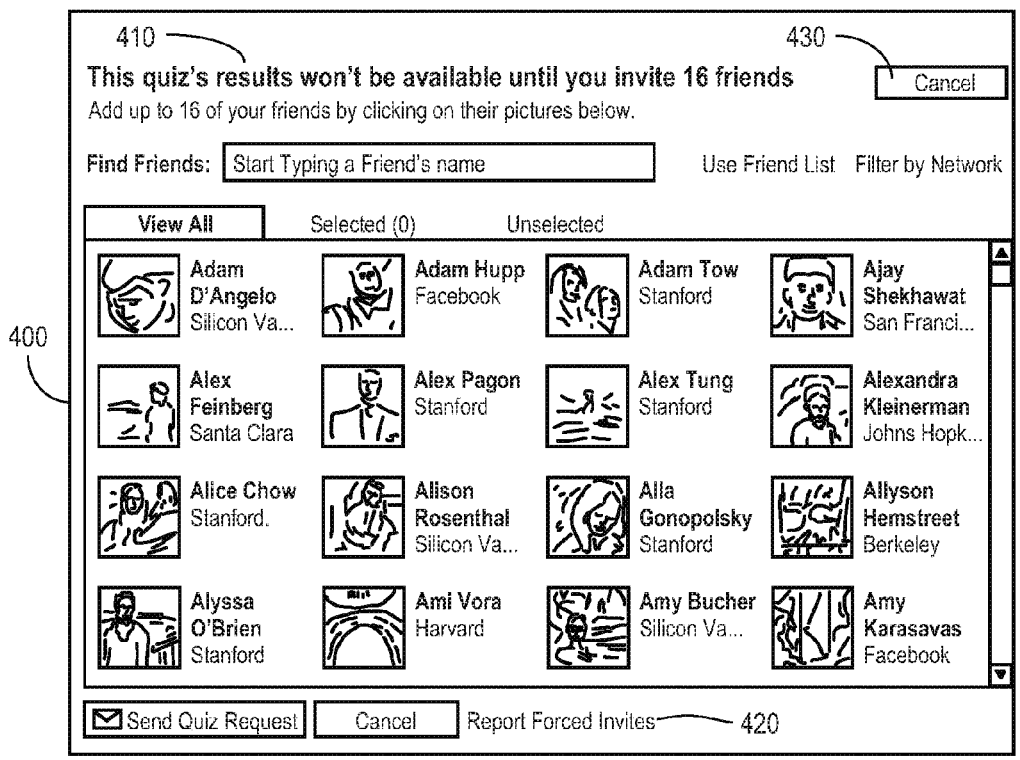
FIG. 4 shows an example of how an application can force members to send invitations to the member's friends.

Invitation Channel 135: An invitation is a message sent by a member inviting another member to do something e.g., a member can invite his friend to install an application. FIG. 4 shows an example of an application forcing a member to send invitations to the member's friends 400 in return for allowing the member to use a particular functionality provided by the application. In this example, the application allows the member to participate in a quiz but does not present the member with the results of the quiz until the member invites 16 of the member's friends to try the quiz application, as indicated by the text banner 410. The report forced invites link 420 provides the member with the ability to report this type of forced behavior to the social networking website.

Figure 5:
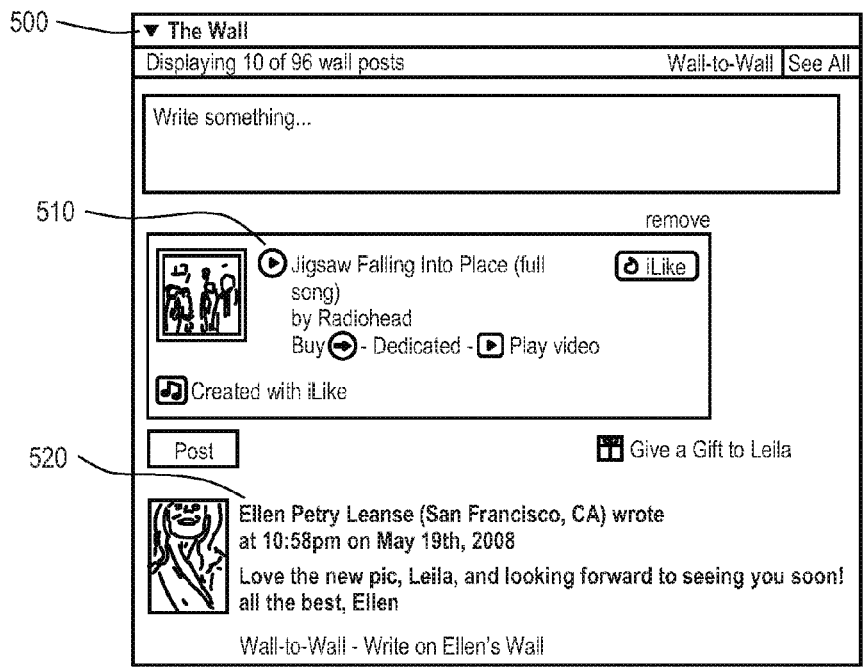
FIG. 5 shows an example of how the wall post channel is used by applications.

Wall Post Channel 150: A wall is an application that allows members to write interesting information to be shared between friends. A message written to a member's wall is called a wall post. A member can post on his own wall, as well as walls of the member's friends. Any friend of a member can see what is written on his wall. FIG. 5 shows an example of a wall 500 and a posting 510 by an application called iLike as well as a posting 520 by a member's friend on the member's wall.

Figure 6:
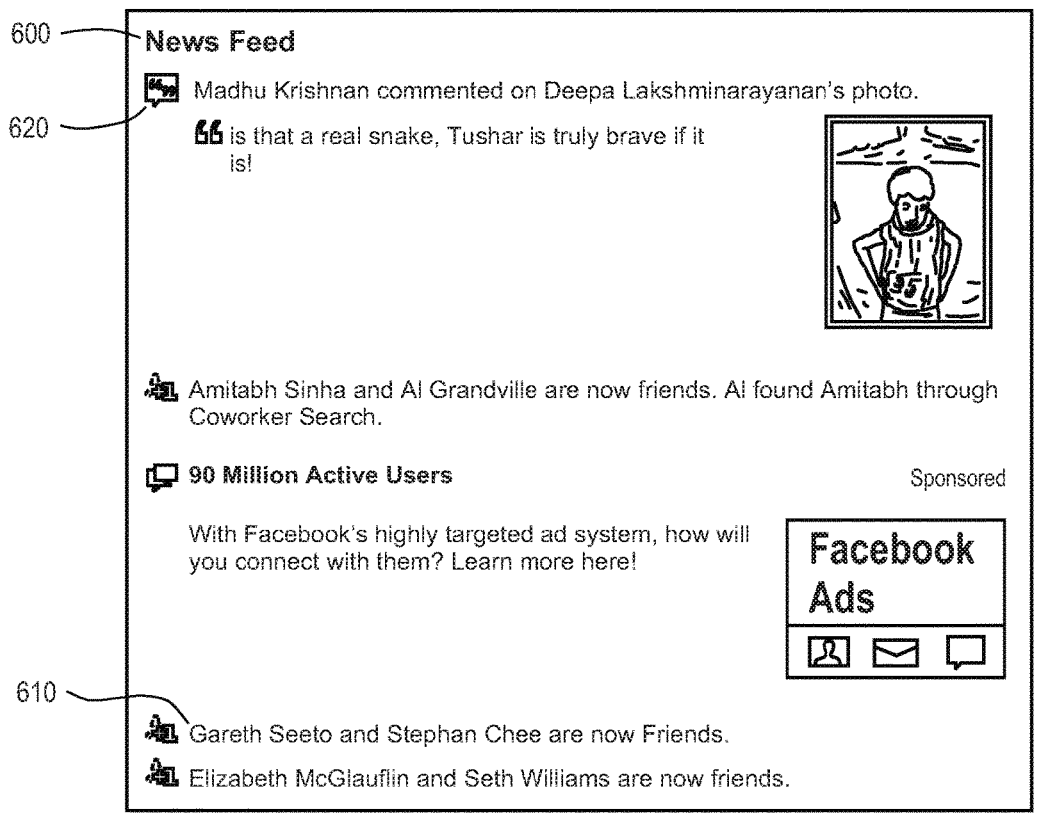
FIG. 6 shows an example of how the newsfeed channel is used by applications.

Newsfeed Channel 155: newsfeed is a constantly updated list of activities done by friends of a member. Such activities include adding applications, commenting on photos, making new friends etc. FIG. 6 shows an example of newsfeed 600 as seen by a member illustrating activities such as other members adding 610 new friends, and other members using 620 applications.

Figure 7:
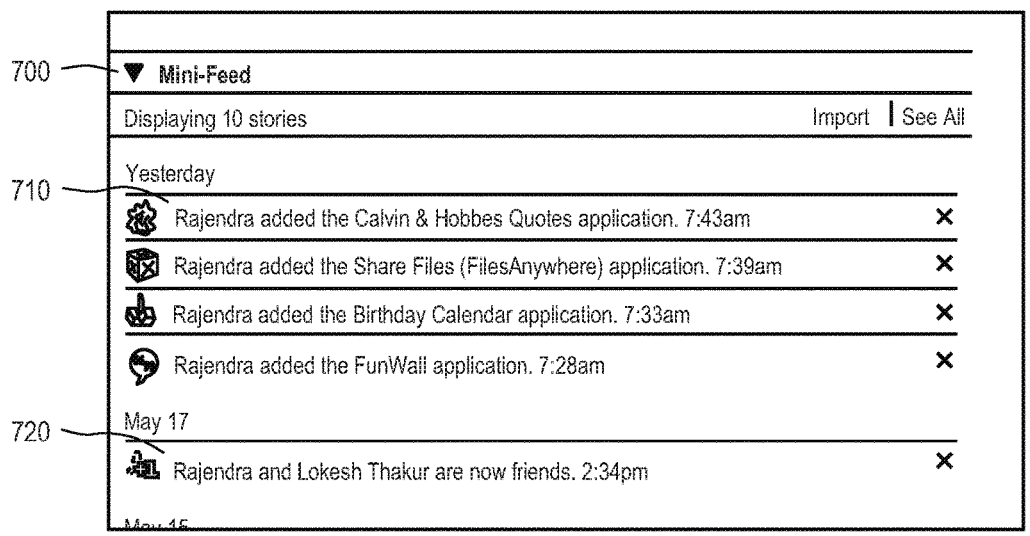
FIG. 7 shows an example of how the mini-feed channel is used by applications.

Mini-feed Channel 160: The mini-feed of a member is a list of actions taken by that member. For example, the member may have added new friends to his social network or installed certain applications. All such activities of a member are listed in the mini-feed of that member. FIG. 7 shows an example of a mini-feed 700 of a member. FIG. 7 shows an example of a story 710 related to the member adding a new application and a story 720 related to the member adding a new friend.

In addition to interactions with other members, the social networking website provides members with the ability to take actions on various types of items supported by the website. These items may include groups or networks (where "networks" here refer not to physical communication networks, but rather to social networks of people) to which members of the website may belong, events or calendar entries in which a member might be interested, computer-based applications that a member may use via the website, and transactions that allow members to buy, sell, auction, rent, or exchange items via the website. These are just a few examples of the items upon which a member may act on a social networking website, and many others are possible.

As illustrated in FIG. 1, the social networking website 100 maintains a number of objects for the different kinds of items with which a member may interact on the website 100. In one example embodiment, these objects include member profiles 175, group objects 180, event objects 185, application objects 190 (respectively, hereinafter, groups 180, events 185, and applications 190). In one embodiment, an object is stored by the website 100 for each instance of its associated item. For example, a member profile 175 is stored for each member who joins the website 100, a group 180 is stored for each group defined in the website 100, and so on. The types of objects and the data stored for each is described in more detail below in connection with FIG. 1.

The member of the website 100 may take specific actions on the website 100, where each action is associated with one or more objects. The types of actions that a member may perform in connection with an object is defined for each object and largely depends on the type of item represented by the object. A particular action may be associated with multiple objects. Described below are a number of examples of particular types of objects that may be defined for the social networking website 100, as well as a number of actions that can be taken for each object. These objects and the actions discussed herein are provided for illustration purposes only, and it can be appreciated that an unlimited number of variations and features can be provided on a social networking website 100.

The social networking website 100 maintains a member profile 175 for each member of the website 100. Any action that a particular member takes with respect to another member is associated with each member's profile 175, through information maintained in a database or other data repository, such as the action log 195. Such actions may include, for example, adding a connection to the other member, sending a message to the other member, reading a message from the other member, viewing content associated with the other member, attending an event posted by another member, among others. In addition, a number of actions described below in connection with other objects are directed at particular members, so these actions are associated with those members as well.

A group 180 may be defined for a group or network of members. For example, a member may define a group to be a fan club for a particular band. The website 100 would maintain a group 180 for that fan club, which might include information about the band, media content (e.g., songs or music videos) by the band, and discussion boards on which members of the group can comment about the band. Accordingly, member actions that are possible with respect to a group 180 might include joining the group, viewing the content, listening to songs, watching videos, and posting a message on the discussion board.

Similarly, an event 185 may be defined for a particular event, such as a birthday party. A member may create the event 185 by defining information about the event such as the time and place and a list of invitees. Other members may accept the invitation, comment about the event, post their own content (e.g., pictures from the event), and perform any other actions enabled by the website 100 for the event 185. Accordingly, the creator of the event 185 as well as the invitees for the event may perform various actions that are associated with that event 185.

The social networking website 100 also enables members to add applications to their profiles. These applications provide enhanced content and interactivity within the social networking website 100, which maintains an application object 190 for each application hosted in the system. The applications may be provided by the website operator and/or by third party developers. An example application is an enhanced messaging service, in which members can send virtual objects (such as a "gift" or "flowers") and an optional message to another member. The use of any functionality offered by the application may thus constitute an action by the member in connection with the application 190. In addition, continuing the example from above, the receipt of the virtual gift or message may also be considered an action in connection with the application 190. It can therefore be appreciated that actions may be passive and need not require active participation by a member. The scope and type of applications provided is limited only by the imagination and creativity of the application developers. Applications are generally written as server-side code that is run on servers of the social networking website 100; an application may also use client-side code as appropriate. Generally, when a user logs into the site, the system determines which applications the user has installed (e.g., registered for) and then loads and runs such applications in combination with the underlying functionality of the social networking website.

Figure 8:
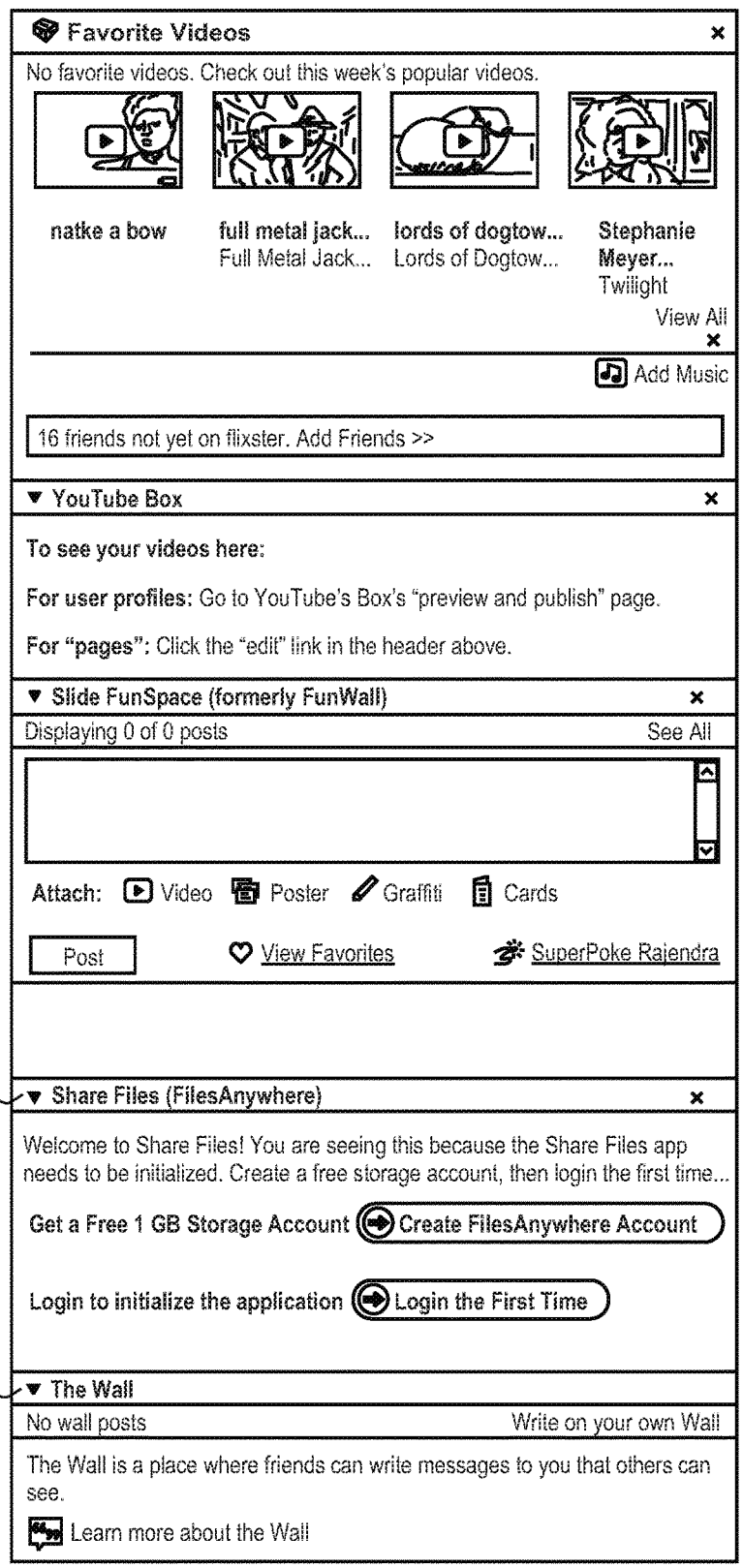
FIG. 8 shows how different applications appear to a member when the member views his home page on the social networking website.

As illustrated in FIG. 1, each member can select which applications to install and run. For example, application A1 120 is installed by member M1 140 and member M3 150 but not by member M2 145. FIG. 8 shows a part of a member's homepage on the social networking website after installing several applications. FIG. 8 shows an application called "The Wall" 800 which is provided by the social networking website 100 and implements the wall post channel 150. Other applications such as ShareFiles 810 shown in FIG. 8 are made available by third party developers. Social networking websites that allow third party developers to develop applications provide a platform 165 for developing new applications. The platform 165 generally includes an application programming interface (API) by which applications can request various types of functions from the social network website 100, such as information pertaining to a user (e.g., information about a user's profile, or a user's friends), as well as functions for accessing the channel resources 110. The availability of a large number of applications is beneficial for such a social networking website because users are likely to visit the website repeatedly to make use of the functionality provided by the applications. A member can choose to uninstall an application installed by the member at any time.

As shown in FIG. 8, a member can have only a limited number of applications on the member's homepage on the social networking website. This limitation may not be imposed by the social networking website per se, but arises from the fact that there is only a limited amount of display space available on a member's homepage. A member may choose to spend a limited amount of time every day on the social networking website. In that time, the member is able to look at limited amount of information as well as use a limited number of applications. Since third party developers keep building new application, there is competition among application developer to get the attention of the members.

Applications are allowed to take advantage of channel resources 110 to get attention of members. For example when a member installs an application, the friends of the member on the social networking website are informed through various channels of the fact that the member has installed that application. Such information can be sent by emails using the email channel 145, posted on the newsfeed using the newsfeed channel 155 etc.

Figure 9:
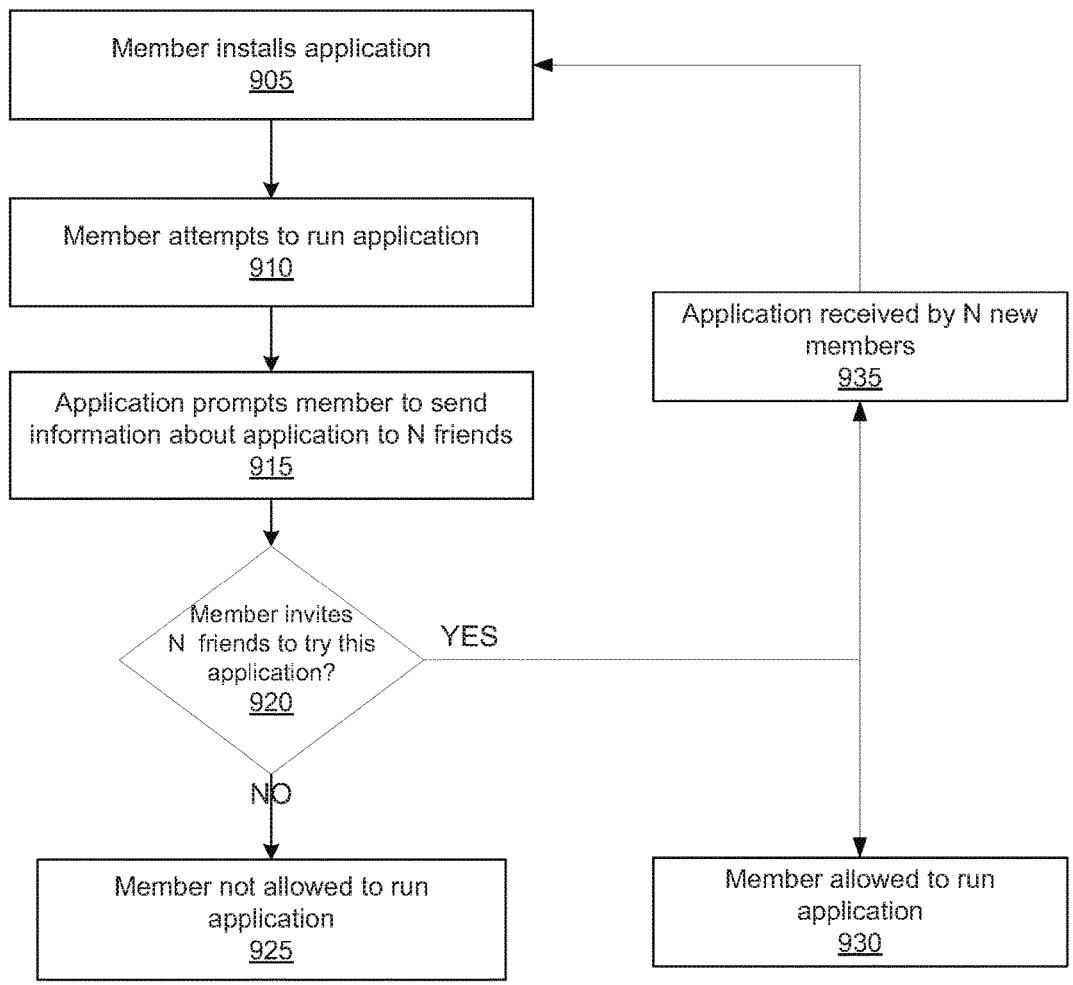
FIG. 9 is flowchart of the process illustrating how applications exploit channels for increasing their user base.

FIG. 9 shows a flowchart illustrating another mechanism used by applications to force a member to invite the member's friends to install and try the application in exchange for the functionality provided by the application. As shown in FIG. 9, after the member installs 905 the application, the member attempts to run 910 the application. At this stage the application prompts 915 the member to invite several friends using the invitation channel 135 to try the application as shown in FIG. 9. A member that refuses to send invitations to the member's friends is not allowed 930 to run the application. If the member complies with the application's request 915 and sends invitations to several of the member's friends to try the application, the member is allowed 925 to run the application. But as a result, several new members learn 935 about the application and the application has a chance to spread its user base.

Because applications are competing for distribution, it is highly likely that some application developers design their applications in a way that members begin to dislike the application behavior. For example, a member may not like being forced to send invitations to the member's friends twice within a short interval of time. There are several behavioral patterns that can be displayed by applications that may not be liked by the members. If there is a large number of applications that display behavior disliked by members, the members may develop a general dislike towards all applications including well behaved applications. This can have significant impact on the social networking website in terms of declining visits from members or even declining membership. It is important for the social networking website to discourage applications that display behavior disliked by members and promote applications that are liked by members. This invention provides a mechanism for a social networking website to quantify how much members like an application based on the member's actions, thereby allowing applications to be compared based on how much they are liked by members, also called user affinity towards the application. Examples of member's actions that indicate the member's positive or negative feedback towards an application include but are not limited to actions such as uninstalling the application, minimizing the application, trying to get more information about the application etc. Several such actions are described in detail below.

Figure 10:
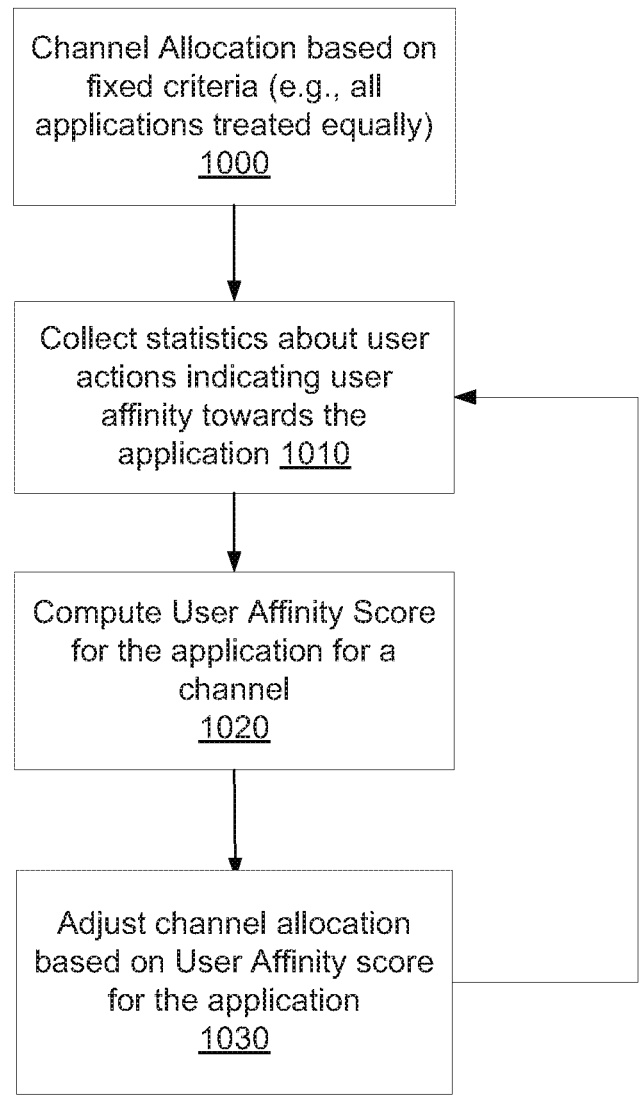
FIG. 10 a flowchart illustrating how a user affinity metric for an application can be used to control channel allocation for the application.

FIG. 10 shows a high-level flowchart illustrating a mechanism to control the behavior of applications as well as control the ability of the applications to increase their user base based on user affinity towards the application. Initially, when very little is known about an application because not enough members have installed the application, a criteria is used to allocate 1000 channel resources for the application. This implies that the application is allowed a predetermined number of messages on each channel. Over time, statistics is collected 1010 based on member actions associated with the application providing positive or negative feedback towards the application. Such statistics is used for computing 1020 a numeric value called the user affinity score associated with each application. Based on the user affinity score of the application, its channel allocation is decided 1030. An application that gets more channel resources has a better chance of being able to communicate with members and being able to increase its user base. This process is repeated periodically so that applications can be periodically given feedback on their user affinity score and given a chance to improve their behavior and be rewarded with better channel resources if they successfully manage to improve their user affinity score.

The mechanism to compute user affinity towards applications is based on member actions associated with applications. When a member takes an action on the social networking website 100, the action is recorded in an action log 195. In one embodiment, the website 100 maintains the action log 195 as a database of entries. When an action is taken on the website 100, therefore, the website 100 adds an entry for that action to the log 195. In one embodiment, an entry comprises some or all of the following information:

Time: a timestamp of when the action occurred.
Member: an identifier for the member who performed the action.
Target: an identifier for the member to whom the action was directed.
Action Type: an identifier for the type of action performed.
Object: an identifier for an object acted on by the action e.g., an application.
Content: content associated with the action.

It can be appreciated that many types of actions that are possible in the website 100 need not require all of this information. For example, if a member changes a picture associated with the member's profile, the action may be logged with just the member's identifier, an action type defining a picture change, and the picture or a link thereto as the content.

System Architecture

Figure 11:
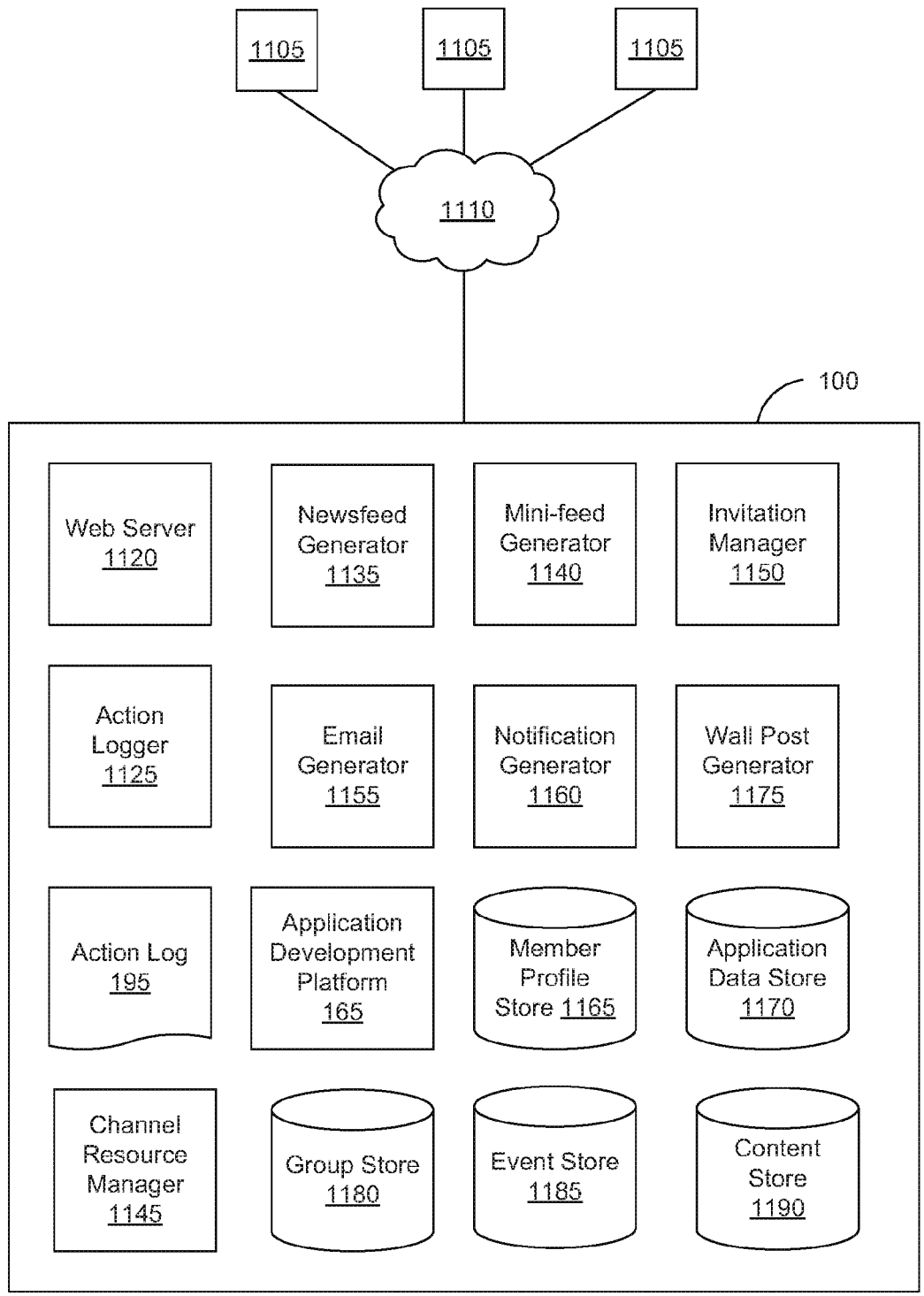
FIG. 11 is the architecture of the system that allows users to run applications on a social networking website, in accordance with an embodiment of the invention.

FIG. 11 is a high level block diagram illustrating a system environment suitable for operation of a social networking website 100. The system environment comprises one or more client devices 1105, a social networking website 100, and a network 1110. In alternative configurations, different and/or additional modules can be included in the system.

The client devices 1105 comprise one or more computing devices that can receive member input and can transmit and receive data via the network 1110. For example, the client devices 1105 may be desktop computers, laptop computers, smart phones, personal digital assistants (PDAs), or any other device including computing functionality and data communication capabilities. The client devices 1105 are configured to communicate via network 1110, which may comprise any combination of local area and/or wide area networks, using both wired and wireless communication systems.

The social networking website 100 comprises a computing system that allows members to communicate or otherwise interact with each other and access content as described herein. The social networking website 100 stores member profiles that describe the members of a social network, including biographic, demographic, and other types of descriptive information, such as work experience, educational history, hobbies or preferences, location, and the like. The website 100 further stores data describing one or more relationships between different members. The relationship information may indicate members who have similar or common work experience, group memberships, hobbies, or educational history. Additionally, the social network host site 100 includes member-defined relationships between different members, allowing members to specify their relationships with other members. For example, these member defined relationships allows members to generate relationships with other members that parallel the members' real-life relationships, such as friends, co-workers, partners, and so forth. Members may select from predefined types of relationships, or define their own relationship types as needed.

FIG. 11 contains a block diagram of the social networking website 100. The social networking website 100 includes a web server 1120, an action logger 1125, an action log 195, a newsfeed generator 1135, a mini-feed generator 1140, a channel resource manager 1145, an invitation manager 1150, an email generator 1155, a notification generator 1160, a wall post generator 1175, an application development platform 165, a member profile store 1165, an application data store 1170, a group store 1180, an event store 1185, and a content store 1190. In other embodiments, the social networking website 100 may include additional, fewer, or different modules for various applications. Conventional components such as network interfaces, security mechanisms, load balancers, failover servers, management and network operations consoles, and the like are not shown so as to not obscure the details of the system.

The web server 1120 links the social networking website 100 via the network 1110 to one or more client devices 1105; the web server 1120 serves web pages, as well as other web-related content, such as Java, Flash, XML, and so forth. The web server 1120 may include a mail server or other messaging functionality for receiving and routing messages between the social networking website 100 and the client devices 1110. The messages can be instant messages, queued messages (e.g., email), text and SMS messages, or any other suitable messaging technique.

The action logger 1125 is capable of receiving communications from the web server 1120 about member actions on and/or off the social networking website 100. The action logger 1125 populates the action log 195 with information about member actions to track them.

The newsfeed generator 1135 generates messages for each member about information that may be relevant to the member, based on actions stored in the action log 195. These messages are called "stories"; each story is an message comprising one or a few lines of information based on one more actions in the action log that are relevant to the particular member. The stories are presented to a member via one or more pages of the social networking website 100, for example in each member's home page or newsfeed page as shown in FIG. 11.

The mini-feed generator 1140 generates messages for each member about actions done by that member. Similar to newsfeed communications, these communications are also stories but mini-feed stories of a member are based only on actions done by that member. In one embodiment, the mini-feed stories 710, 720 are presented to the member on the mini-feed section 700 of the member's home page as shown in FIG. 7.

The invitation manager 1150 controls how many invitations an application is allowed to send. An application may force a user to send invitations as shown in FIG. 4 and the member may choose to send out a large number of invitations to the member's friends 400 but the invitation manager 1150 may decide to send only some of those invitations.

The email generator 1155 generates emails for members based on activities associated with the member's friends. For example, the use of a specific application by the member's friend may cause an email to be sent to the member. FIG. 2 shows an example of such an email 200 sent by an application to a member.

The notification generator 1160 generates notification messages for a member informing the member about activities that happened on the social networking website related to that member. For example, a notification may inform a member that a friend posted a message on the member's wall. FIG. 3 shows an example of a notification 300 as seen on a member's homepage 170 on the social networking website The wall post generator 1175 generates wall post messages for members. For example, a message about a new application being available may be posted on a member's wall. FIG. 5 shows an example of an application posting a message 510 on a member's wall 500.

As discussed above, the social networking website 100 maintains data about a number of different types of objects with which a member may interact on the website 100. To this end, each of the member profile store 1165, application data store 1170, the group store 1180, the event store 1185, and the content store 1190 stores instances of the corresponding type of object maintained by the website 100. Each object type has information fields that are suitable for the storing information appropriate to the type of object. For example, the event store 1185 contains data structures that include the time and location for an event, whereas the member profile store 1165 contains data structures with fields suitable for describing a member's profile. When a new object of a particular type is created, the website 100 initializes a new data structure of the corresponding type, assigns a unique object identifier to it, and begins to add data to the object as needed. This might occur, for example, when a member defines a new event, wherein the website 100 would generate a new instance of an event in the event store 1185, assign a unique identifier to the event, and begin to populate the fields of the event with information provided by the member.

Figure 12:
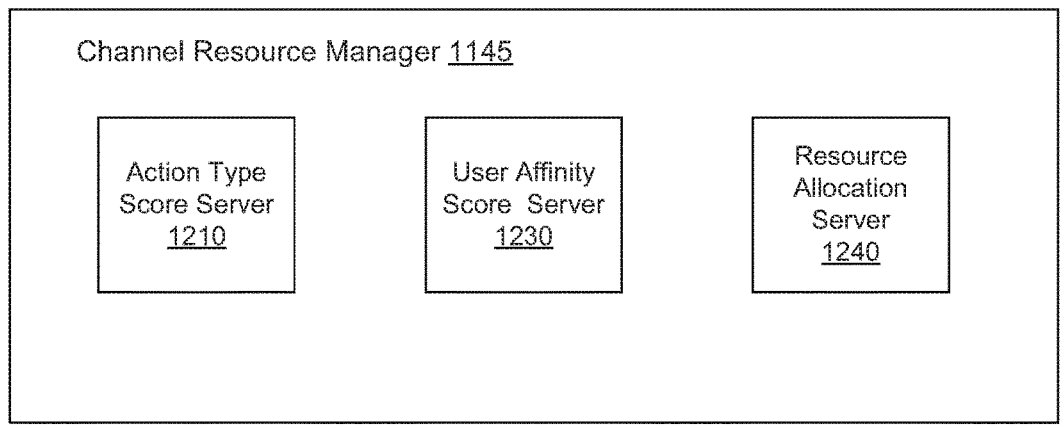
FIG. 12 is a detailed block diagram the resource manager component shown in FIG. 11.
Figure 13:
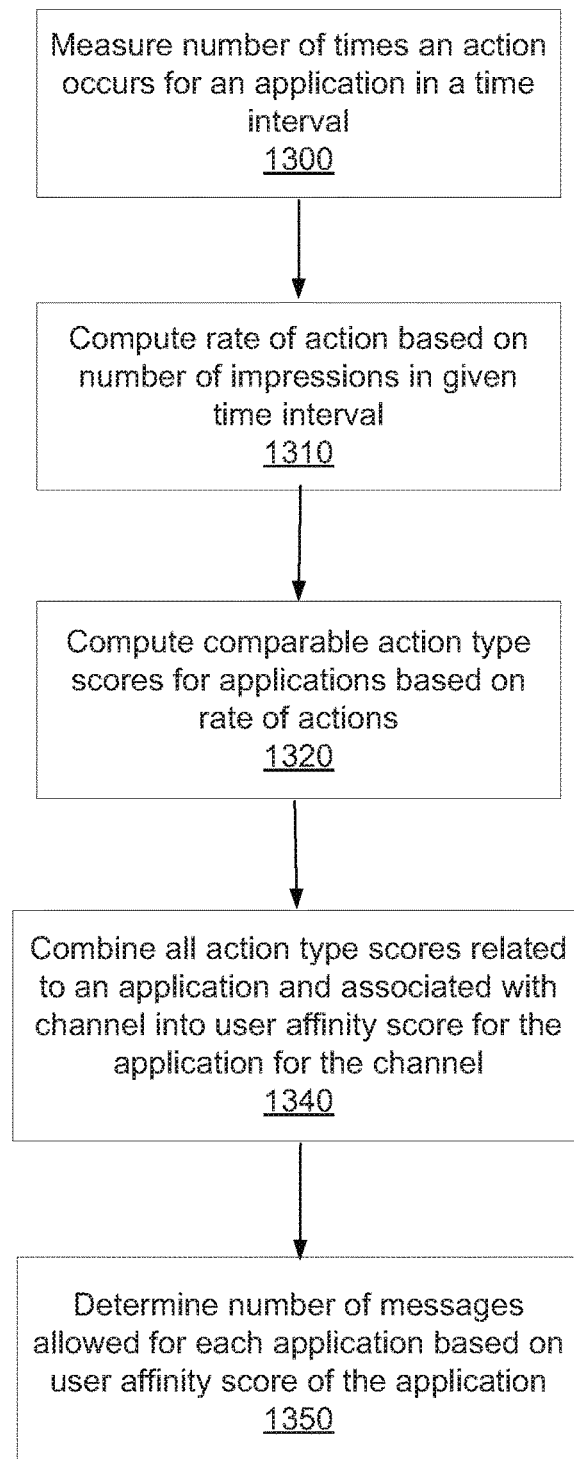
FIG. 13 is a flow chart of a process for computing user affinity score for applications that can be used to compare all applications across a channel.

The channel resource manager 1145 allocates channel resources to different applications. This component is shown in more detail in FIG. 12. The various steps executed by the channel resource manager 1145 are shown in the flowchart in FIG. 13. The action type affinity metrics server 1210 collects 1300 statistics related to user actions that provides positive or negative feedback towards applications. In one embodiment the action affinity metrics server 1210 periodically analyses action data available in action log 195. Alternatively, various components associated with different actions update the action type affinity metric server 1210 with action information as the action takes place. The action type affinity metric server 1210 computes 1310 the rate of actions taken by members in a given time interval and uses the rate of actions to compute 1320 the action affinity metric value for each action associated with an application and a given channel. Examples of several action affinity metrics are provided in the next section. The action scores of related sets of actions are combined 1340 to compute the user affinity score of the application for a channel by the user affinity score server 1230. The user affinity score of the application for a channel is used to determine 1350 the channel allocation for the application by the resource allocation server 1240. The overall process executed by the channel resource manager 1145 is described in detail in the next section.

User Affinity Score of Applications

Computation of the user affinity score of the application for a channel as a single numeric value that represents the user affinity score for an application for a channel is difficult because there is no particular action or event that measures the user affinity towards an application. In fact there can be a very large number of user actions each contributing to a varying degree towards calculating the user affinity towards the application. Examples of such actions are presented below for each channel:

1. Actions Related to Invitation Channel

An application may force a member to send invitations to the member's friends to install and try the application multiple times within a short time interval. The invitation manager 1150 places a "report forced invite" link on the invitation page if the application is suspected of forcing the members more than they like. For example, if the force invite page is shown to the member within a very short interval (e.g., 10 seconds), the second page shows a "report forced invite" link that the member can click on to report being forced to invite frequently. When the application forces a member to send invitations, the member is presented with the option to skip the step of sending the invitations by clicking on a cancel button 430 as shown in FIG. 4. If the members clicks on the cancel button and the application again attempts to force the member to send invitation within a short interval (e.g., 2 minutes) the second forced invitation screen presents the user with the report forced invite link 420 giving the member a mechanism to inform the social networking website of such a behavior on the part of the application.

In one embodiment, the report forced invite link 420 is not provided with all invitation pages unless there are suspicious circumstances as described above, based on the duration between forced invites, or other coercive application behavior. Under normal circumstances the applications are allowed to force members to send invitations to their friends to try the application since this is a significant mechanism that the applications reply on to increase their user base. Note that other embodiments can always show the report force invite link 420 each time an application forces members to send out invitations to try the application.

Recipients of such invitations are also given an opportunity to give positive or negative feedback for the invitation. The following actions are presented as examples of such feedback from a member. A button or a link can be provided by the social networking website to allow the member to take appropriate action.

Figure 14:
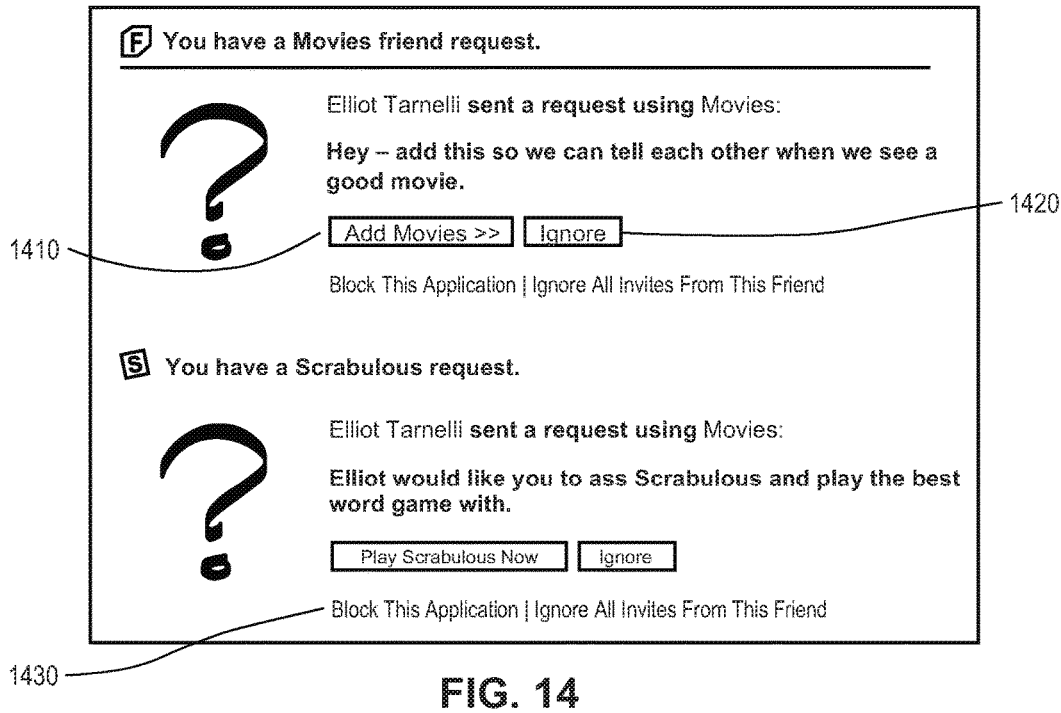
FIG. 14 shows how a member invited to try an application can either choose to add the application, ignore invitation messages from the application or block the application from sending more messages to the member.

Accept the Invitation: The user can accept the invitation by clicking on the button 1410 provided in the invitation to add the application as shown in FIG. 14. This action indicates that the member wants to accept the invitation (positive feedback indicating member likes the application).

Ignore the Invitation: The user can ignore the invitation by clicking on the ignore button 1420 as shown in FIG. 14. This action indicates that the member wants to ignore the invitation (negative feedback indicating member dislikes the application).

Figure 15:
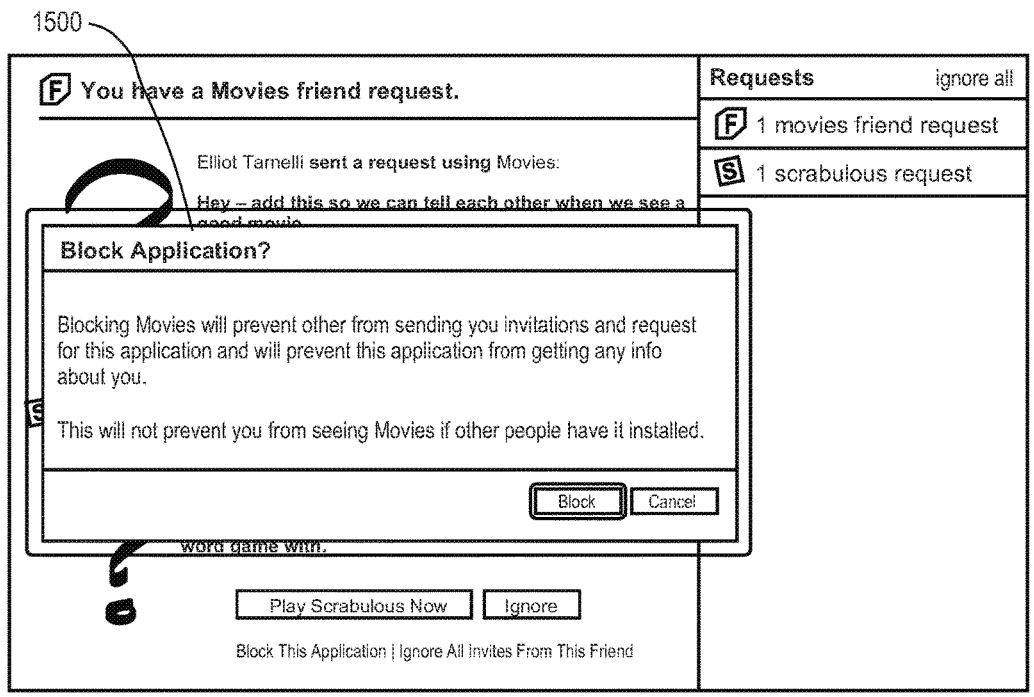
FIG. 15 shows a confirmation prompt from the social networking website when the member blocks an application from sending invitations to the member.

Block the Application: The user can block all future invitations from an application by clicking on the link 1430 provided in the invitation as shown in FIG. 14. This action provides a strongly negative feedback indicating the member's strong dislike for the application. Since this action provides a strongly negative feedback, the social networking website 100 displays a dialog box 1500 asking for confirmation as shown in FIG. 15.

2. Actions Related to Email Channel

Figure 16:
FIG. 16 shows an example of how a member can disallow an application from sending email messages.

When emails are sent by applications, a link 220 is provided to the member in the email that allows the member to disable emails from the application as shown in FIG. 2. If the member clicks on the disable email link 220 for the application, the application cannot send any more emails to that member. The number of times members click on the disable email link for an application is a measure of a member's dislike towards the applications from the members. FIG. 16 shows an alternative mechanism provided to a member to disable emails sent by an application by changing the settings for the application. The member can disallow an application from sending emails to the member by changing the setting 1600 for the application that determines if the application is allowed to contact the member by email.

3. Actions Related to Notification Channel

Figure 17:
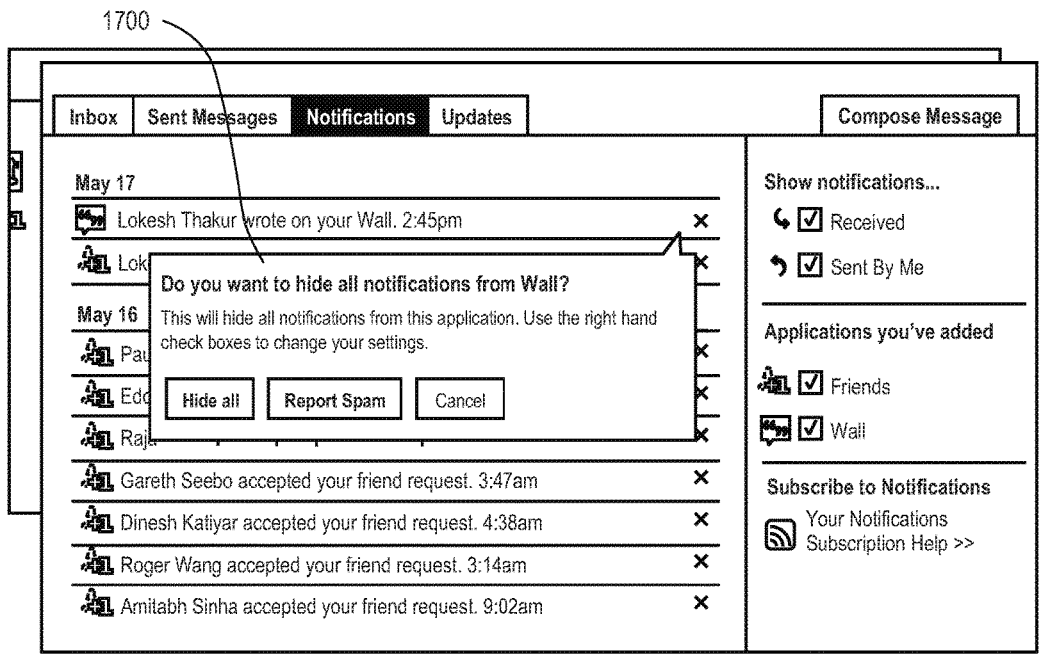
FIG. 17 shows how a member can choose to hide all notifications from a given application.
Figure 18:
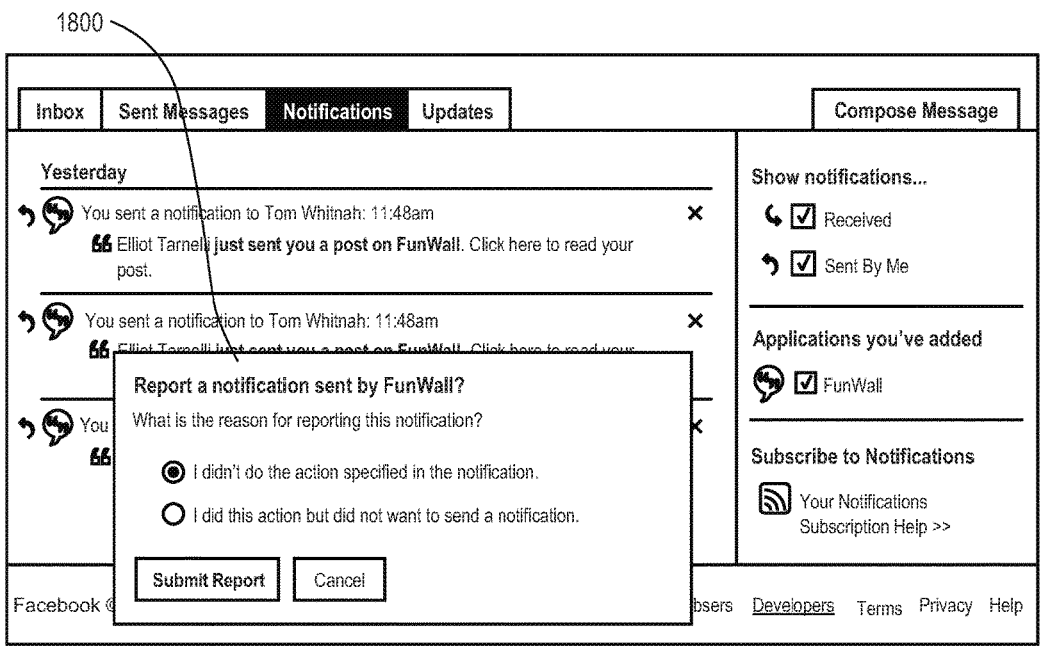
FIG. 18 shows how a member can report to the social networking website when an application sends a notification on behalf of the member that the member believes should not have been sent.

If a member does not like notifications received from an application the member can hide the notification message. FIG. 17 shows how a social networking website provides a dialog box 1700 that allows a member to hide notifications from an application. An application whose notifications are hidden by a large number of members in a given interval of time is considered to be disliked by the members. Other metrics associated with the notification channel can be based on the sender's affinity towards the notification sent by the application. The sender has the opportunity to report if the application sent notification that they disliked. FIG. 18 shows how the social networking website provides a dialog box 1800 that allows a member to report unwanted notifications sent by an application.

4. General Metrics for any Application (Independent of Channel)

Figure 19:
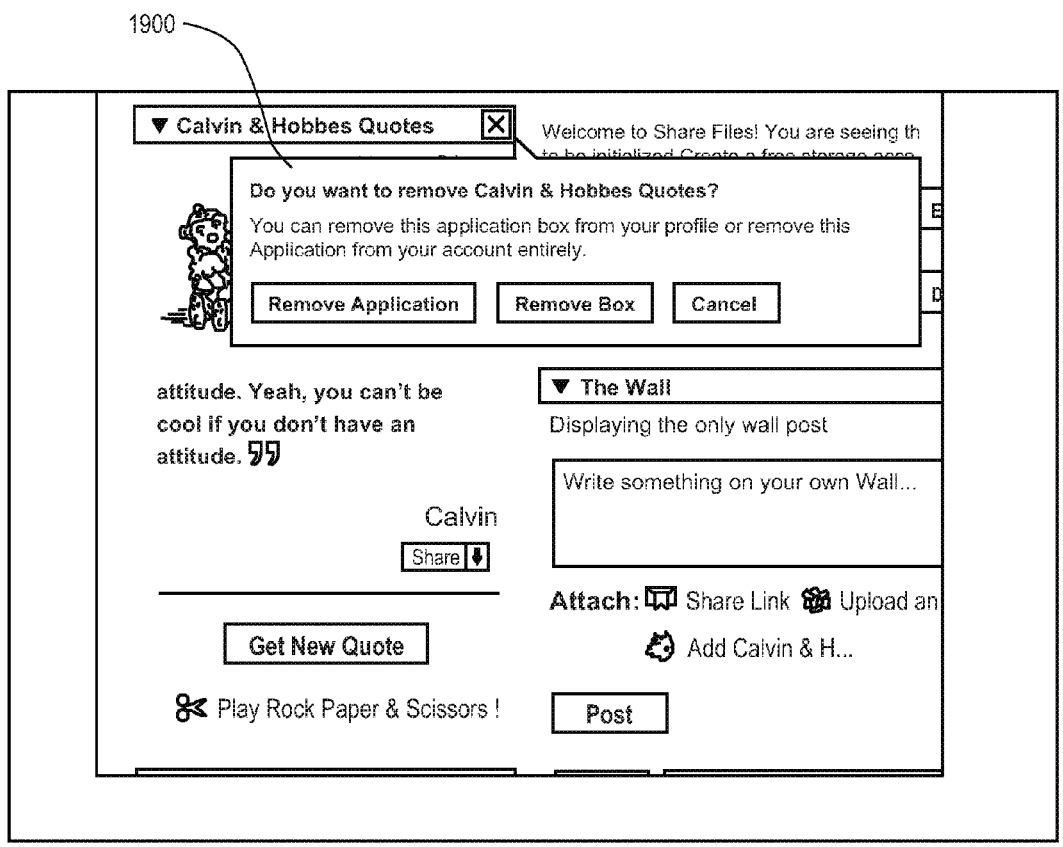
FIG. 19 shows how a member can remove an application.

There are certain actions that apply to any application, independent of the channel used. FIG. 19 shows an example of a member attempting to uninstall an application. In this embodiment, the social networking website showing a dialog box 1900 asking for confirmation to uninstall the application. If the member uninstalls an application, they have abandoned the application. This is a very strong indication of the member's dislike towards the application.

An attempt on the part of a member to run an application is an indication that the member likes the application. A member can click on an application after installing it on the member's homepage as viewed on the social networking website or while viewing the application on the member's friend's homepages. By clicking on the application, the member is indicating an interest in the application. The higher the number of clicks on the application, the more the application is considered liked by the members.

There are certain other actions on the part of members that are indicative of mild dislike for an application. A member is allowed to minimize an application thereby leaving the possibility of being able to run the application again in future without having to install the application again. A member minimizing an application indicates a desire to hide the application and this is considered an indication of dislike towards the application. It is possible that the member minimizes the application only temporarily and maximizes it again. In that case the two actions are considered as cancelling each other, and the negative effect of the user minimizing the application is offset by the opposite action of maximizing the application at a later time. The member, for example, may want to minimize certain applications during working hours but maximize them during non-working hours. In this situation, the member wants to use the application only at specific hours of the day and displays affinity towards the application.

5. Computation of Action Type Affinity Score

The examples presented above indicate how actions of members related to an application can be associated with varying degree of like/dislike towards the application. The degree of like/dislike is converted into a numeric value so as to allow the metrics to be compared across channels and applications. Actions taken by users can be considered as instances of different action types. An example of an action type is the user minimizing a mini-feed story and an example of an instance of this action type is the action of a particular user clicking on a screen displaying a mini-feed story to minimize it. The rate of occurrence of an action of a given type is computed. This rate is indicative of the likelihood that an action of an action type x is taken when the application is presented to a member. If over a period of time an application is presented to various members N times, and the number of times an action of action type x was taken by members is K, the likelihood that a member takes an action of action type x when presented by application a is given by $P(x|a)$ which is the probability of a member taking an action of action type x given the fact that the member was presented with application a. The following equation (1) shows the computation of $P(x|a)$ as a percentage value:

$$P(x|a) = \frac{K}{N} \times 100\% \qquad (1)$$

The value of $P(x|a)$ for two different action types x1 and x2 for an application may not be comparable against each other without taking into account the rate of occurrence of the respective action types across all applications. For example, assume the average rate of actions of action type x1 across all applications is 10%. In this case, if $P(x1|a1)$ is 5%, then $P(x1|a1)$ is below average. On the other hand, the average rate of actions of action type x2 across all applications is assumed to be 0.1%. In this case, if $P(x2|a1)$ is 0.5%, this value is higher than average. As a result, even though the value of $P(x1|a1)$ happens to be 5% which is numerically much higher than the value of $P(x2|a1)$ that happens to be 0.5%, the two numeric values cannot be compared without the context of the average rate of the respective action for all applications.

The rate of occurrence of an action of action type x for application a is normalized by the average rate of occurrence of actions of action type x across all (or a selected sample of) applications. The average rate of occurrence of action x across all applications can be represented as $P(x)$ which is the probability of occurrence of action x. This probability is not conditional on any application and is therefore the average rate of action x across all application. The action affinity score for action x for an application a can be represented by $s(x|a)$ and is computed by the following equation.

$$s(x|a) = \log \frac{P(x|a)}{P(x)} \qquad (2)$$

The above equation normalizes the probability of occurrence of actions of action type x when the member sees application a by the average chance that action x is taken by a member irrespective of any application. The ratio of two probabilities is exponential since very small values of the denominator can lead to extremely large values of the fraction. Computing the log of the ratio of the probabilities makes the overall function linear, i.e., modest changes of P(x|a) and P(x) values cause modest changes of the values of the overall function. Note that the computation of the value of the action affinity score s(x|a) is very efficient and can be computed very efficiently even for very large number of applications and actions. The equation (2) represents one mechanism to normalize the ratio of probabilities. Any other mechanism to normalize the value of P(x|a) based on P(x) can be used instead.

6. Combining Action Type Affinity Scores

The action type affinity scores associated with an application for a given channel are combined together to get a numeric score for the application for a given channel. For example there may be several action type affinity scores associated with the invitation channel:

Ignores per received invite

Accepts per received invite

Skips per impression where an impression is the event of an application being shown on the webpage of the social networking website to a user Force invite removes per impression All these action type affinity scores associated with an application for a channel are assigned specific weights before being combined into the user affinity score of the application for the channel. The following equation is one embodiment of the mechanism to combine action type scores into user affinity score of the application for the channel (called S) for the application:

$$S = \sum_{i=1}^{k} w_i * s_i \quad (3)$$

Figure 20:
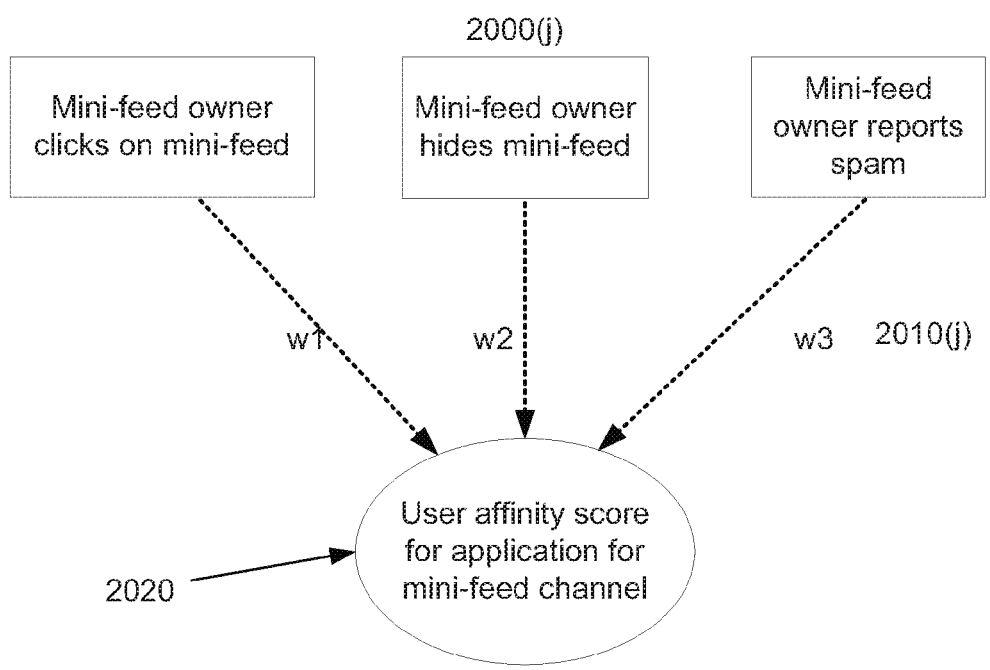
FIG. 20 illustrates the computation of user affinity score for an application for a channel based on weighted combination of user action scores.

In the equation (3):

$s_i$ is the action type score s(x|a) for the $i^{th}$ action $w_i$ is the weight associated with the $i^{th}$ action The summation is computed over all actions such that the index i corresponds to the $i^{th}$ action and there are k such actions. The weight $w_i$ corresponding to each action type affinity score in equation (3) is a predetermined constant. FIG. 20 shows an example illustrating the computation of the user affinity score 2020 of the application for the mini-feed channel based on equation (3). As shown in FIG. 20, each action type score 2000 is calculated and the user affinity score 2020 for the application for mini-feed channel is calculated as the sum of the action type score multiplied by their respective weights 2010.

User affinity scores of an application independent of channels can also be calculated. This is computed based on either a weighted sum of all the individual action type scores independent of the channels or by combining the user affinity scores of the applications calculated for individual channels. Such a score is valuable in terms of making decisions related to the applications independent of channels. For example, an application with a very low user affinity score independent of channels can be removed from the social networking website.

Scoring Based on User Weights

The calculation of user affinity scores based on equation (5) does not take into account user behavior differences. User behavior differences can have impact on the calculation of user affinity scores because some users are more diligent than others in giving feedback. For example, an active member of the social networking website may accept every single request from friends though very few of them are used by the member. On the other hand another member may be very selective in terms of accepting request only if the member uses the requests. The acceptance of requests done by members who are careful and selective in their actions need to be weighed higher than the acceptance by members who accept requests indiscriminately. To prevent calculating the user affinity scores from being biased due to user behavior differences, an alternative embodiment is presented that calculates user affinity scores by taking into account member behavior differences. The users are classified into different sets where each set represents a typical behavior pattern. The user action scores are calculated for different member groups and aggregated. An equation for calculating the member action scores is $$s(x|a) = \sum_{g=1}^{q} P_g(x|a) * \log \frac{P_g(x|a)}{P_g(x)} \quad (6)$$

where s(x|a) is the user action score;

$P_g(x)$ is the average probability of action x in user group g;

$P_g(x|a)$ is the average probability of an action x in group g;

q is the total number of user groups.

The equation (6) weighs the user action score calculations for each user group by the factor $P_g(x|a)$ which gives the average probability of action x in the group g. Equation (2) can be considered a special case of equation (6) where there is only one user group. The action scores computed by equation (6) can be combined to compute user affinity scores based on equation (5).

Channel Resource Allocation Based on User Affinity Score of an Application for a Channel As described in the previous section, each application receives a user affinity score with respect to each channel. For each application, channel resources are allocated to the application, based on its user affinity score. A channel monitors the usage of a channel resource by the application during a time interval is. The application is not allowed to use more channel resource than determined by the allocation of the channel resource for the application based on its user affinity score. An example of a channel resource used by an application comprises messages sent on a channel that allows applications to communicate with users by sending messages. Various mechanisms are possible for computing the channel resource allocation based on the user affinity score of the application for a channel. In one embodiment, if the user affinity score of the application indicates low user affinity, an application that communicates by sending messages on a channel is allowed to send fewer messages on the channel compared to applications with user affinity score indicating high user affinity. In another embodiment, if the user affinity score of the application computed in a time interval is low the application is not allowed to send any messages in subsequent time intervals. In another embodiment if the user affinity score of the application is low, the application is disabled from being accessible to the members of the social network. Alternatively, if the user affinity score of the application indicates at least a minimum user affinity for the application, the application is enabled to be accessible to the users of the social networking website.

Channel resource allocation for each application is precomputed and available as a table lookup for each channel. Such a table comprises possible user affinity scores mapped to certain values from which channel allocation is easy to calculate, for example, the total number of messages the application is allowed to send on the channel per day. The user affinity scores to channel allocation mapping is recomputed periodically since the factors used to determine the mapping change over time, for example, application developers change the behavior of existing applications and new applications are added. As an example, the channel allocation for the mini-feed channel may be made available as the number of mini-feed stories allowed per day and the number of mini-feed stories allowed per day per user for the application given the application's user affinity score value. The following table gives an example mapping.

| Mini-Feed Channel Score of Application | Mini-Feed Stories Allowed for the Application Per Day Per User | Maximum number of Mini-Feed Stories Allowed for the Application Per Day |
|---|---|---|
| −1.0 | 1 | 1,000 |
| −0.5 | 2 | 2,000 |
| 0.0 | 4 | 4,000 |
| 0.5 | 6 | 6,000 |
| 1.0 | 10 | 10,000 |

In this example, the user affinity score for the application for the mini-feed channel ranges from −1.0 to 1.0 and a maximum of 10 mini-feed stories are allowed for an application per day, per member for the best possible score and a maximum of 10,000 min-feed stories are allowed for the application per day such that the application is not allowed to send out more than 10,000 messages per day irrespective of the number of members using the application. For various mini-feed channel score values, the number of mini-feed stories allowed per day per member and the maximum number of mini-feed stories allowed per day for the application is provided for the channel. For example if the mini-feed channel score value for an application is 0.0, the number of mini-feed stories per day for the application as obtained from the above table is 4. For channel score values that occur in between the values available in the table, the number of mini-feed stories can be obtained by taking the nearest value available in the table. For example if the mini-feed channel score value is 0.25, the number of mini-feed stories per day has to be calculated based on the fact that mini-feed channel score 0.0 maps to 4 mini-feed stories per day and score 0.5 maps to 6 mini-feed stories per day, so the score value of 0.25 which is in between 0.0 and 0.5 maps to 5 mini-feed stories per day which is the value in between 4 and 6.

The mapping of user affinity scores to channel resource allocation for the invitation channel 135 is computed similarly. Assume that an application is allowed to send a maximum of 50 invitations per member per day as part of forced invites. Even though a member may provide the application with 40 friends to whom the application may send invitations to try the application, if the invitation channel score of the application is −0.5, the invitation manager 1150 limits the number of invitations sent by the application per day, per member to 20 and the total number of invitations for the application per day to 20,000 as provided by the following table.

| Invitation Channel Score of the Application | Number of Invitations allowed for the Application Per day Per User | Number of Invitations allowed for the Application Per day |
|---|---|---|
| −1.0 | 10 | 10,000 |
| −0.5 | 20 | 20,000 |
| 0.0 | 30 | 30,000 |
| 0.5 | 40 | 40,000 |
| 1.0 | 50 | 50,000 |

Note that the values presented in the above tables are intended to be examples for illustration purpose. Other mechanisms of mapping the user affinity score values to channel allocation are possible e.g., ranges of channel score values can be mapped to channel allocation values. An alternative embodiment calculates the channel allocation for each application for a channel, based on a mathematical function or a procedure that is executed instead of looking up the tables described above.

The user actions are written to the action log 195 by the action logger 1125 continuously. The statistics related to user actions used for measuring user affinity are collected 1010 periodically and used to compute the user affinity scores for a channel for the application which is further used to compute 1030 the channel allocation for the application. This computation of channel allocation is repeated for an application based on a predetermined schedule. The schedule also determines the order in which the channel allocation of different applications is computed. The schedule for computing the channel allocation for various applications can change over time.

An alternative embodiment computes a measure called the damped user affinity score for an application in a given time interval based on the user affinity score computed using equation (6) for a given time interval as well as a plurality of the user affinity score values computed for the application in previous time intervals. Such a damped user affinity score computation considers the historical values of the user affinity score of the application and disallows sudden changes in the channel score for the application. Thus, an application with a low user affinity score is disallowed from suddenly increasing its user affinity score by changing its behavior. The following equation gives one possible mechanism of computing the damped user affinity score based on the user affinity score computed for a time interval combined with the user affinity score of the previous time interval:

$$SD=k*S_c+(1-k)*SD_p) \qquad (8)$$

where
SD is the damped user affinity being calculated for an application for a given time interval;
$S_c$ is the user affinity score value of the application computed for the time interval using equation (6) or an equivalent equation;
$SD_p$ is the value of the damped user affinity score value of the application computed for the previous time interval;
k is a predetermined constant that has a value such that k<=1.

The user affinity scores of applications for a given time interval is saved and used for computing the channel score for the next time interval.

The channel allocation for each application based on the number of messages allowed for each application per day per member and the maximum number of messages allowed for the application per day is calculated periodically based on updated statistics collected for the actions of different action types. The computation of channel allocation for the applications can be done for all applications at once in a given time interval if the number of applications is small or the calculation can be scheduled for sets of applications at different times if the number of applications is very large, to avoid performance issues during the computation.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
   providing access to a plurality of applications provided by third-party developers on a social networking system;
   receiving information about a plurality of interactions of a plurality of users of the social networking system, the interactions relating to one or more of the applications, each interaction associated with one of a plurality of action types, each action type associated with a measure of affinity of a user for an application;
   aggregating the interactions of the plurality of users for a subject application of the plurality of applications based on the action types;
   determining, by the social networking system, a user affinity score for the subject application indicating affinity of the users of the social networking system for the application, the user affinity score based at least in part on the aggregated interactions, weighted based on the action types of the interactions; and
   receiving, by the social networking system, request to send one or more messages associated with the subject application; and
   determining whether to send the one or more messages based on the user affinity score for the subject application, wherein determining whether to send the one or more messages comprises determining to send the one or more messages responsive to the user affinity score for the subject application exceeding a predetermined threshold value.

2. The method of claim 1, wherein determining whether to send the one or more messages comprises:
   determining to block the one or more messages if the user affinity score for the subject application is below the predetermined threshold value.

3. The method of claim 1, wherein the one or more messages comprise a message for sending information describing the subject application.

4. The method of claim 1, wherein the one or more messages comprise a request to a user of the social networking system to interact with the social networking system in relation to the subject application.

5. The method of claim 1, wherein the one or more messages are sent by a user of the social networking system executing the subject application, each of the one or more messages including information describing the subject application and sent to another user connected to the user via the social networking system.

6. The method of claim 1, wherein each action type is associated with a channel, wherein the channel is a computer mediated communication mechanism for facilitating communication between users of the social networking system and the social networking system.

7. The method of claim 6 wherein the channel comprises one of: notification channel, invitation channel, mini-feed channel, and wall post channel.

8. The method of claim 1, wherein the user affinity score represents a likelihood of a user taking an action of a particular action type when presented with a specific application.

9. The method of claim 1, wherein the predetermined threshold value is a first predetermined threshold value, further comprising:
   determining to disable the subject application from being accessible to users of the social networking system if the user affinity score for the subject application is below a second predetermined threshold value.

10. The method of claim 1, wherein the one or more messages comprise information for promoting the subject application.

11. A non-transitory computer-readable storage medium storing instructions for:
provinding access to a plurality of applications provided by third-party developers on a social networking system;
receiving information about a plurality of interactions of a plurality of users of the social networking system, the interactions relating to one or more of the applications, each interaction associated with one of a plurality of action types, each action type associated with a measure of affinity of a user for an application;
aggregating the interactions of the plurality of users for a subject application of the plurality of applications based on the action types;
determining, by the social networking system, a user affinity score for the subject application indicating affinity of the users of the social networking system for the application, the user affinity score based at least in part on the aggregated interactions, weighted based on the action types of the interactions; and
receiving, by the social networking system, request to send one or more messages associated with the subject application; and
determining whether to send the one or more messages based on the user affinity score for the subject application, wherein determining whether to send the one or more messages comprises determining to send the one or more messages responsive to the user affinity score for the subject application exceeding a predetermined threshold value.

12. The non-transitory computer-readable storage medium of claim 11, wherein determining whether to send the one or more messages comprises:
determining to block the one or more messages if the user affinity score for the subject application is below the predetermined threshold value.

13. The non-transitory computer-readable storage medium of claim 11, wherein the one or more messages comprise a message for sending information describing the subject application.

14. The non-transitory computer-readable storage medium of claim 11, wherein the one or more messages comprise a request to a user of the social networking system to interact with the social networking system in relation to the subject application.

15. The non-transitory computer-readable storage medium of claim 11, wherein the one or more messages are sent by a user of the social networking system executing the subject application, each of the one or more messages including information describing the subject application and sent to another user connected to the user via the social networking system.

16. The non-transitory computer-readable storage medium of claim 11, wherein each action type is associated with a channel, wherein the channel is a computer mediated communication mechanism for facilitating communication between users of the social networking system and the social networking system.

17. The non-transitory computer-readable storage medium of claim 16 wherein the channel comprises one of: notification channel, invitation channel, mini-feed channel, and wall post channel.

18. The non-transitory computer-readable storage medium of claim 11, wherein the user affinity score represents a likelihood of a user taking an action of a particular action type when presented with a specific application.

19. The non-transitory computer-readable storage medium of claim 11, wherein the one or more messages comprise information for promoting the subject application.

20. A computer system, comprising:
an electronic processor; and
a non-transitory computer-readable storage medium storing instructions for execution by the electronic processor, the instructions for:
providing access to a plurality of applications provided by third-party developers on a social networking system;
receiving information about a plurality of interactions of a plurality of users of the social networking system, the interactions relating to one or more of the applications, each interaction associated with one of a plurality of action types, each action type associated with a measure of affinity of a user for an application;
aggregating the interactions of the plurality of users for a subject application of the plurality of applications based on the action types;
determining, by the social networking system, a user affinity score for the subject application indicating affinity of the users of the social networking system for the application, the user affinity score based at least in part on the aggregated interactions, weighted based on the action types of the interactions; and
receiving, by the social networking system, request to send one or more messages associated with the subject application; and
determining whether to send the one or more messages based on the user affinity score for the subject application, wherein determining whether to send the one or more messages comprises determining to send the one or more messages responsive to the user affinity score for the subject application exceeding a predetermined threshold value.

21. The computer system of claim 20, wherein the one or more messages are sent by a user of the social networking system executing the subject application, each of the one or more messages including information describing the subject application and sent to another user connected to the user via the social networking system.

22. The computer system of claim 20, wherein the user affinity score represents a likelihood of a user taking an action of a particular action type when presented with a specific application.

* * * * *

UNITED STATES PATENT AND TRADEMARK OFFICE
CERTIFICATE OF CORRECTION

PATENT NO. : 9,832,150 B2
APPLICATION NO. : 15/006004
DATED : November 28, 2017
INVENTOR(S) : Thomas Scott Witnah et al.

Page 1 of 1

It is certified that error appears in the above-identified patent and that said Letters Patent is hereby corrected as shown below:

In the Claims

Column 20, Line 57, in Claim 7, after "one of:" insert -- a --.
Column 20, Line 57, in Claim 7, after "notification channel," insert -- an --.
Column 20, Line 57, in Claim 7, after "invitation channel," insert -- a --.
Column 20, Line 58, in Claim 7, after "channel, and" insert -- a --.
Column 21, Line 25, in Claim 11, after "system," insert -- a --.
Column 22, Line 6, in Claim 17, after "one of:" insert -- a --.
Column 22, Line 6, in Claim 17, after "notification channel," insert -- an --.
Column 22, Line 6, in Claim 17, after "invitation channel," insert -- a --.
Column 22, Line 6, in Claim 17, after "channel, and" insert -- a --.
Column 22, Line 39, in Claim 20, after "networking system," insert -- a --.

Signed and Sealed this
Ninth Day of April, 2019

Andrei Iancu
*Director of the United States Patent and Trademark Office*